US011059505B2

(12) United States Patent
Qiao et al.

(10) Patent No.: US 11,059,505 B2
(45) Date of Patent: Jul. 13, 2021

(54) VERSATILE ELECTRIC CARTS

(71) Applicant: INTRADIN (HUZHOU) PRECISION TECHNOLOGY CO., LTD., Zhejiang (CN)

(72) Inventors: Xuetao Qiao, Zhejiang (CN); Junliang Wang, Zhejiang (CN)

(73) Assignee: INTRADIN (HUZHOU) PRECISION TECHNOLOGY CO., LTD., Huzhou (CN)

(*) Notice: Subject to any disclaimer, the term of this patent is extended or adjusted under 35 U.S.C. 154(b) by 101 days.

(21) Appl. No.: 16/445,032

(22) Filed: Jun. 18, 2019

(65) Prior Publication Data

US 2020/0361505 A1 Nov. 19, 2020

(30) Foreign Application Priority Data

May 13, 2019 (CN) .......................... 201920675241.4

(51) Int. Cl.
*B62B 3/02* (2006.01)
*B62B 5/00* (2006.01)
*B62B 3/12* (2006.01)

(52) U.S. Cl.
CPC ................ *B62B 3/02* (2013.01); *B62B 5/00* (2013.01); *B62B 5/0033* (2013.01); *B62B 3/12* (2013.01)

(58) Field of Classification Search
CPC .......... B62B 5/00; B62B 5/0033; B62B 3/12; B62B 3/02; B62B 1/20
USPC ....................................................... 180/65.1
See application file for complete search history.

(56) References Cited

U.S. PATENT DOCUMENTS

| 8,985,619 | B2* | 3/2015 | Celli | .................. B62B 1/20 280/653 |
| 9,956,976 | B1* | 5/2018 | Akre | .................. B62B 3/02 |
| 2004/0080205 | A1* | 4/2004 | Ducharme | ............... B62B 3/08 298/2 |
| 2015/0123361 | A1* | 5/2015 | Willett | .................. B62B 1/202 280/47.18 |
| 2018/0201290 | A1* | 7/2018 | Guerdrum | ................ B62B 3/12 |

FOREIGN PATENT DOCUMENTS

| CN | 204210540 U | 3/2015 |
| CN | 204688144 U * | 10/2015 |
| CN | 204688144 U | 10/2015 |
| CN | 205769357 U * | 12/2016 |

(Continued)

*Primary Examiner* — John D Walters
*Assistant Examiner* — Hilary L Johns

(57) ABSTRACT

A versatile electric cart, including a frame, a handle, a battery, a motor, a wheel and an axle. The frame is provided with components connecting with attachments. The components include a snib, a bolt, a connecting hole and a T-shaped column. The snib is provided at the rear end of the frame. The front and rear beam of the frame are both provided with the screw hole. The front end of the frame is provided with the connecting hole and the T-shaped column. The T-shaped column is provided at the axle, the top and bottom of the T-shaped column are both provided with the screw hole. The front end of the T-shaped column is provided with the connecting hole. The frame is provided with the battery. The attachments are fitted to the frame by the snib, the screw hole, the connecting hole or the T-shaped column.

9 Claims, 6 Drawing Sheets

(56) References Cited

FOREIGN PATENT DOCUMENTS

| CN | 205769357 U |   | 12/2016 |
|----|-------------|---|---------|
| CN | 207875677 U | * | 9/2018  |
| CN | 207875677 U |   | 9/2018  |

* cited by examiner

VERSATILE ELECTRIC CARTS

CROSS-REFERENCE TO RELATED APPLICATIONS

This application claims the benefit of priority from Chinese Patent Application No. CN201920675241.4, filed on May 13, 2019. The content of the aforementioned application, including any intervening amendments thereto, is incorporated herein by reference in its entirety.

TECHNICAL FIELD

The present disclosure relates to outdoor tools, and more particularly to a versatile electric cart.

BACKGROUND OF THE INVENTION

Cart is a vehicle for transport that is generally used in construction, transportation and life fields. There are various carts having different frame structures for a wide range of applications in the market. Since the transporting of different goods requires different carts, a variety of carts with different structures are usually needed to meet different needs, which is not only costly but also takes up space, making it inconvenient to people's lives. Currently there is no cart with a frame having structures that can be connected to different attachments for different purposes. Such a cart fitted with different attachments can meet people's needs and save money and space.

SUMMARY OF THE INVENTION

The object of the present invention is to provide a versatile electric cart that is simple in structure and has structures fitted with different attachments. Versatile electric carts with different functions can be formed by replacing different attachments to achieve different purposes.

In order to achieve the object above, the technical solution adopted by the present invention is as follows. A versatile electric cart including a frame, a handle, a battery, a motor, a snib, a screw hole, a connecting hole, a wheel, an axle and a T-shaped column. The battery is configured to power the motor. The wheels are driven by the motor to rotate. The snib, the screw hole, the connecting hole and the T-shaped column are the components connected and fitted with the attachments.

The screw hole includes a front beam screw hole provided on the front beam, a rear beam screw hole provided on the rear beam, a first T-shaped column screw hole of the horizontal portion of the T-shaped column and a second T-shaped column screw hole of the vertical portion of the T-shaped column.

The frame is provided with a battery. The snib is provided at the rear end of the frame. The front beam of the frame is provided with a front beam screw hole. The front beam screw hole is a longitudinal screw hole, and the rear beam of the frame is provided with a rear beam screw hole. The rear beam screw hole is a vertical screw hole. Two sides of a front end of the frame are both provided with the connecting holes and the T-shaped columns. The T-shaped column is provided on the axle. The horizontal portion of the T-shaped column is provided with a first T-shaped column screw hole. The vertical portion of the T-shaped column is provided with a second T-shaped column screw hole. The front end of the T-shaped column is provided with a connecting hole. The attachments are fitted to the frame by the snib, the screw hole, the connecting hole or the T-shaped column. The frame is fitted with multiple attachments to form the versatile electric cart with multiple functions.

The attachments include a hopper. The front end of the cart hopper is provided with a first U-shaped groove. The rear end of the hopper is provided with a grip. The first U-shaped groove is clamped on the connecting hole and fixed by a bolt. The first U-shaped groove is rotatable about the bolt when the hopper is turned. The hopper is provided with a longitudinal beam connecting with the first U-shaped groove. The front end face of the longitudinal beam and the front end face of the first U-shaped groove are in the same vertical plane. When the first U-shaped groove is rotated around the bolt, the longitudinal beam is not in contact with the connecting hole. When the hopper is turned, the first U-shaped groove is rotatable about the bolt, and the cart hopper is not stuck by the connecting hole. The groove opening width of the first U-shaped groove is greater than the width of the T-shaped column. When the cart hopper is turned, the first U-shaped groove is rotatable about the bolt and is not stuck by the T-shaped column. When the holding groove of the grip is clamped on the snib, the hopper is fixed on the frame to form a hopper cart.

The attachments include a mesh hopper. The front end of the mesh hopper is provided with a second U-shaped groove. The middle transom of the mesh hopper is provided with a screw hole. The rear end of the mesh hopper is provided with a grip. The second U-shaped groove is clamped on a connecting hole and fixed by the bolt. The second U-shaped groove is rotatable about the bolt when the mesh hopper is turned. The groove opening width of the second U-shaped groove is greater than the width of the T-shaped column. The second U-shaped groove is rotatable about the bolt and is not stuck by the T-shaped column when the mesh hopper is turned. The holding groove of the grip is clamped on the snib. The screw hole is screwed with the rear beam screw hole, so that the mesh hopper is fixed on the frame to form a mesh hopper cart.

The attachments include a tow ball head. The rear end of the tow ball head is provided with a screw hole screwed with the front beam screw hole. A side of the tow ball head is provided with a screw hole screwed with the first T-shaped column screw hole, so that the tow ball head is fixed on the frame to form a tractor.

The attachments include a shovel. The rear end of the shovel is provided with a screw hole fixed the second T-shaped column screw hole by the bolt, so that the shovel is fixed on the frame to form a scraper. The width of the rear end of the shovel is less than the spacing between the two connecting holes on the two sides of the front end of the frame. The distance between the shovel and the ground can be adjusted.

BRIEF DESCRIPTION OF THE DRAWINGS

The disclosure will be further described with reference to the accompanying drawings and embodiments.

Figure 1:
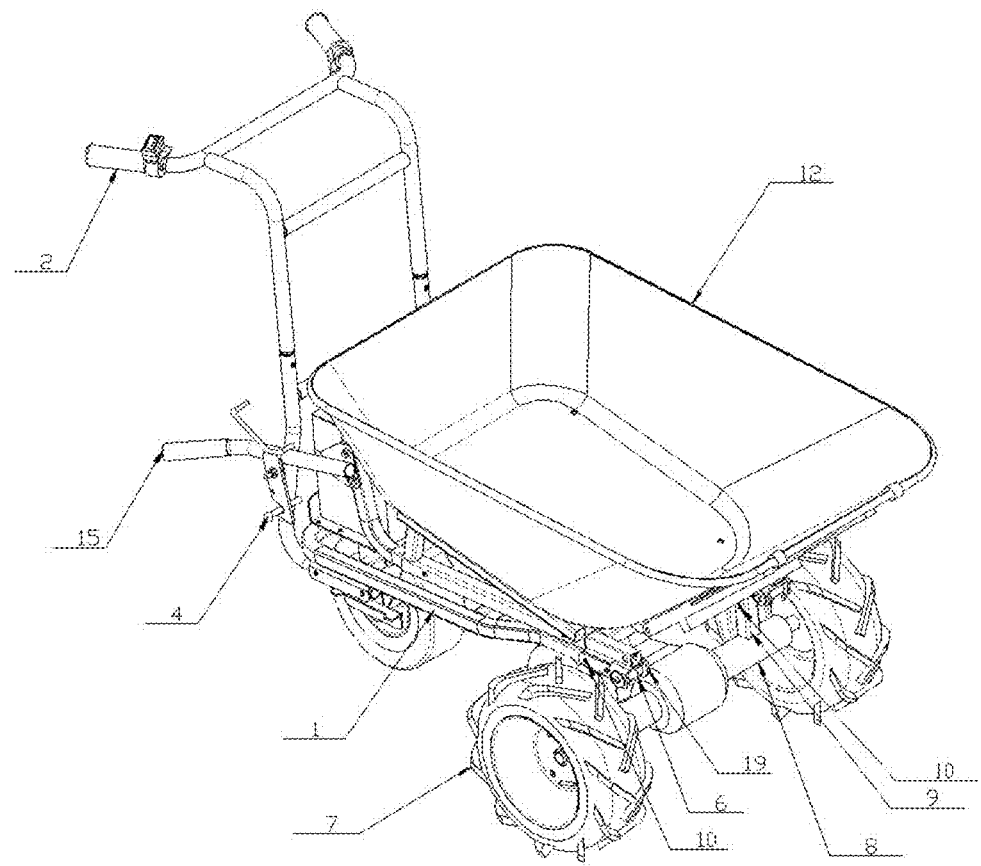
FIG. 1 is a schematic diagram showing a cart with a hopper according to the present invention.

In the drawings: 1, frame; 2, handle; 3, battery; 4, snib; 5, rear beam screw hole; 6, connecting hole; 7, wheel; 8, axle; 9, T-shaped column; 10, second T-shaped column screw hole; 11, front beam screw hole; 12, hopper; 13, lifting hook; 14, reversible board; 15, grip; 16, grip; 17, mesh hopper; 18, split pin; 19, first U-shaped groove; 20, second U-shaped groove; 21, first T-shaped column screw hole.

DETAILED DESCRIPTION OF EMBODIMENTS

The embodiments of the present invention will be described in detail with reference to the drawings.

As shown in FIGS. 1-5, a versatile electric cart includes a frame 1, a handle 2, a battery 3, a snib 4, a rear beam screw hole 5, a front beam screw hole 11, a connecting hole 6, a wheel 7, an axle 8, a T-shaped column 9, a second T-shaped column screw hole 10 and a first T-shaped column screw hole 21. The frame 1 is provided with the battery 3. The snib 4 is provided at a rear end of the frame 1. A front beam of the frame 1 is provided with the front beam screw hole 11. The front beam screw hole 11 is a longitudinal screw hole. A rear beam of the frame 1 is provided with the rear beam screw hole 5 of the frame 1, the rear beam screw hole 5 is a vertical screw hole. Two sides of a front end of the frame 1 are both provided with the connecting holes 6 and the T-shaped columns 9. The T-shaped column 9 is provided on the axle 8. A front end of the T-shaped column 9 is provided with the connecting hole 6. A horizontal portion of the T-shaped column 9 is provided with the first T-shaped column screw hole 21. A vertical portion of the T-shaped column 9 is provided with the second T-shaped column screw hole 10. The T-shaped column 9 is connecting with the connecting hole 6. The snib 4, the rear beam screw hole 5, the front beam screw hole 11, the second T-shaped column screw hole 10, the connecting hole 6 and the T-shaped column 9 are the components connected to the attachments. The attachments are fitted to the frame by the snib 4, the rear beam screw hole 5, the front beam screw hole 11, the connecting hole 6, the second T-shaped column screw hole 10 or the first T-shaped column screw hole 21. The frame is fitted with multiple attachments to form the versatile electric cart with multiple functions. Different purposes and different carts are achieved by replacing with multiple attachments fixed on the frame 1.

The attachments include a hopper 12, a mesh hopper 17, a tow ball head and a shovel. The hopper 12, the mesh hopper 17, the tow ball head or the shovel etc. fit with the frame 1 to form the versatile electric carts with different functions such as a cart, a flatbed cart, a tractor or a scraper etc.

Figure 2:
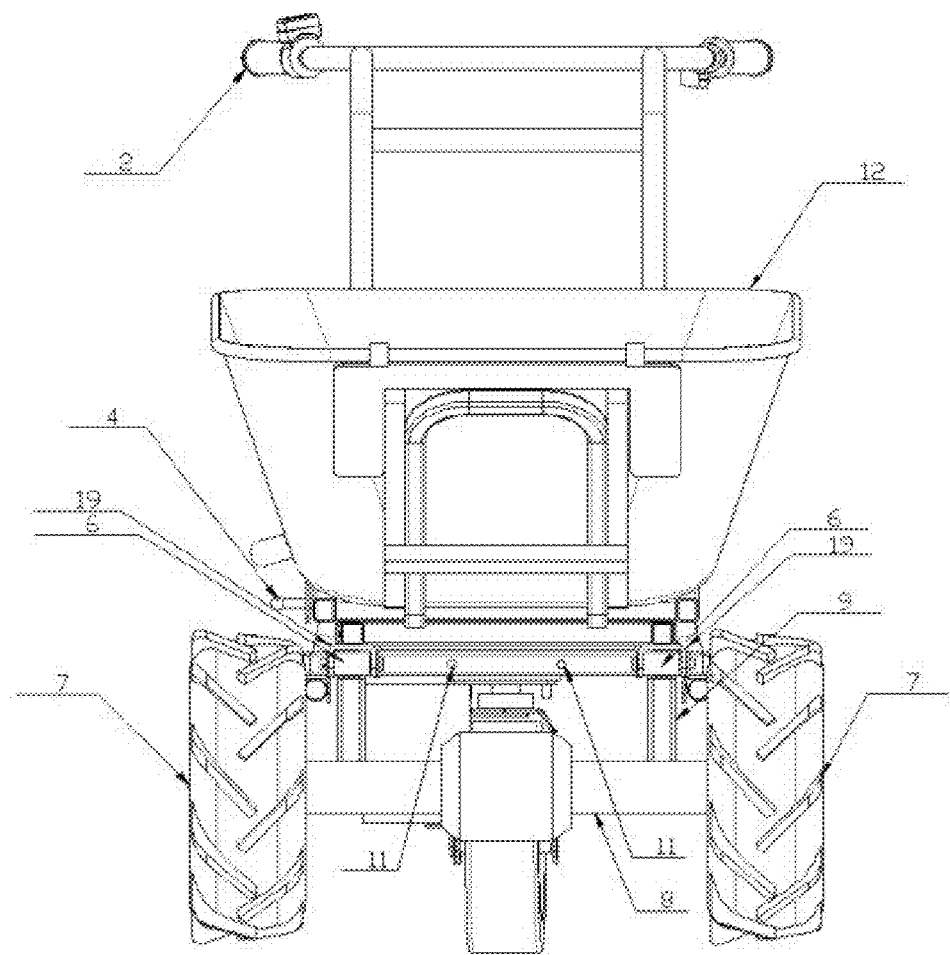
FIG. 2 is a front view showing the cart with the hopper according to the present invention.
Figure 3:
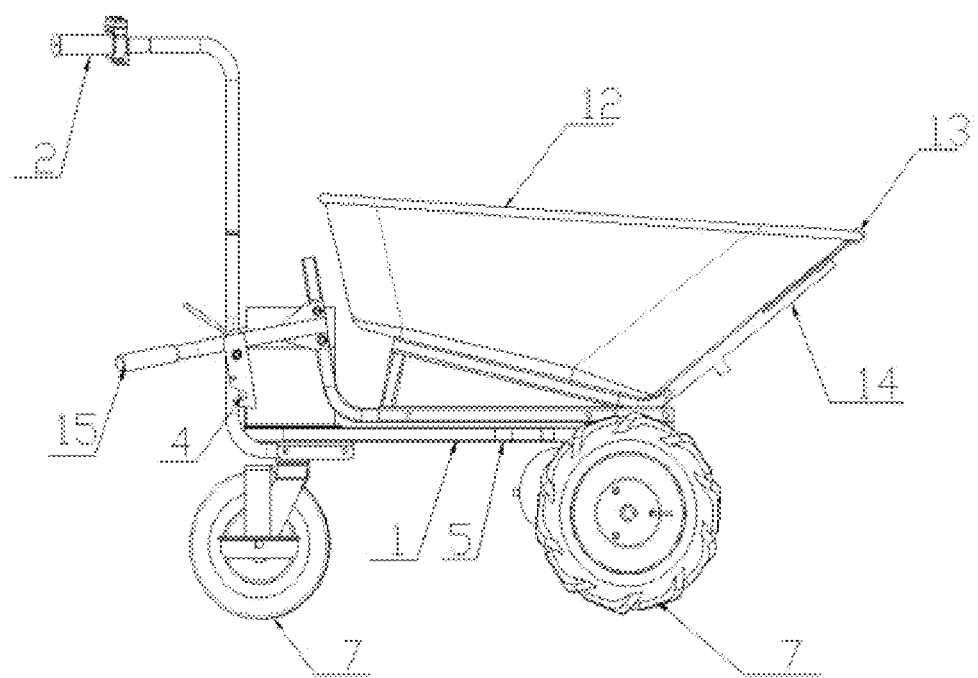
FIG. 3 is a left view showing the cart with the hopper according to the present invention.

FIGS. 1-3 show a hopper cart of the present invention fitted with the hopper 12. A front end of the hopper 12 is provided with a first U-shaped groove 19, a rear end of the hopper 12 is provided with a grip 15. The hopper 12 is provided with a longitudinal beam connecting with the first U-shaped groove 19. The first U-shaped groove 19 of the hopper 12 is clamped on the connecting hole 6 and fixed by a bolt. A holding groove of the grip 15 is clamped on the snib 4, so that the hopper 12 is fixed and the hopper cart capable of transporting bulk materials etc. is formed. The first U-shaped groove 19 is rotatable about the bolt when the hopper 12 is turned. The hopper 12 is provided with the longitudinal beam connecting with the first U-shaped groove 19. A front end face of the longitudinal beam and the front end face of the first U-shaped groove 19 are in the same vertical plane. The longitudinal beam is not contacted with the connecting hole 6 when the first U-shaped groove 19 is rotated about the bolt. The first U-shaped groove 19 is rotated around the bolt and not stuck by the connecting hole 6 when the hopper 12 is turned. The groove opening width of the first U-shaped groove 19 is greater than the width of the T-shaped column 9. When the hopper 12 is turned, the first U-shaped groove 19 is rotated around the bolt and not stuck by the T-shaped column 9.

The hopper 12 is placed on the frame 1 when in use, the U-shaped groove 19 of the hopper 12 is clamped on the connecting hole 6 and fixed by the bolt. When the grip 15 is pressed down, the holding groove of the grip 15 is clamped on the snib 4 to form the hopper cart. The objects that need to be transported are put into the hopper 12, the switch is pressed to select the forward or reverse gear, then the motor powered by the battery 3 drives the wheels 7 to rotate for transporting. When the objects are transported to the destination, the switch is pressed to stop the power supply of the battery 3 and the wheels 7 stop rotating. The grip 15 is pushed to separate the holding groove from the snib 4 and then pushed up, the hopper 12 is flipped up, the first U-shaped groove 19 is rotated around the bolt, thereby unloading the objects. The grip 15 is provided under the handle 2. It requires less effort to unload the objects in the hopper 12 by pushing up the grip 15 than the handle 2.

The hopper 12 is provided with a reversible board 14 and a lifting hook 13, which are folded when not in use. When a large heavy object need to be carried, such as a refrigerator, the grip 15 is pushed to separate the holding groove from the snib 4 and then pushed up, the hopper 12 is flipped up. The reversible board 14 is flipped and fixed. The first U-shaped groove 19 is rotated around the bolt. The reversible board 14 is inserted into the bottom of the object. Then the grip 15 is pushed down, the hopper 12 is flipped down, the first U-shaped groove 19 is rotated about the bolt, the hopper 12 is reset. The holding groove of the grip 15 is clamped on the snib 4, the cart is operated to move. When a small irregular heavy object need to be carried, the grip 15 is pushed to make the holding groove separate from the snib 4 and the grip 15 is pushed up, the hopper 12 is flipped up. The first U-shaped groove 19 is rotated around the bolt, the lifting hook 13 is flipped out. The heavy object is fastened by a rope. The hopper 12 is flipped up to drive the lifting hook 13 to hook the rope. The grip 15 is pushed down vigorously, the hopper 12 is flipped down. The first U-shaped groove 19 is rotated around the bolt, the hopper 12 is flipped up to hoist up the heavy object, then the cart is operated to move.

Figure 4:
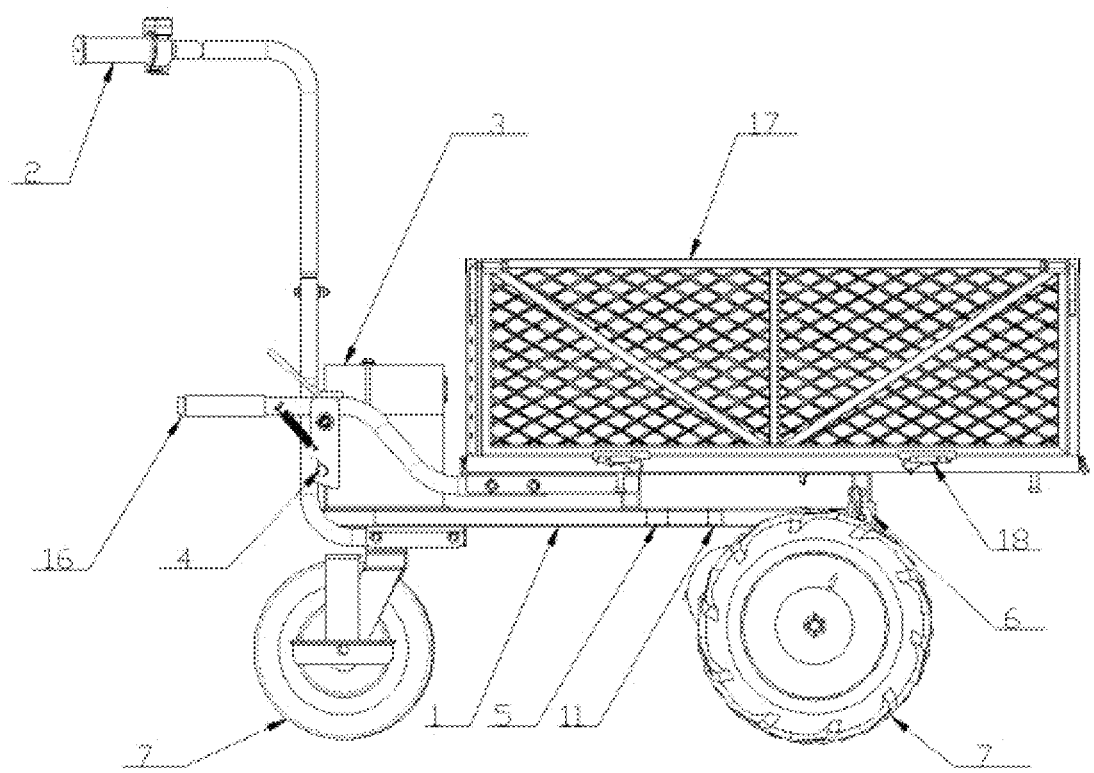
FIG. 4 is a left view showing the cart with a mesh hopper according to the present invention.
Figure 5:
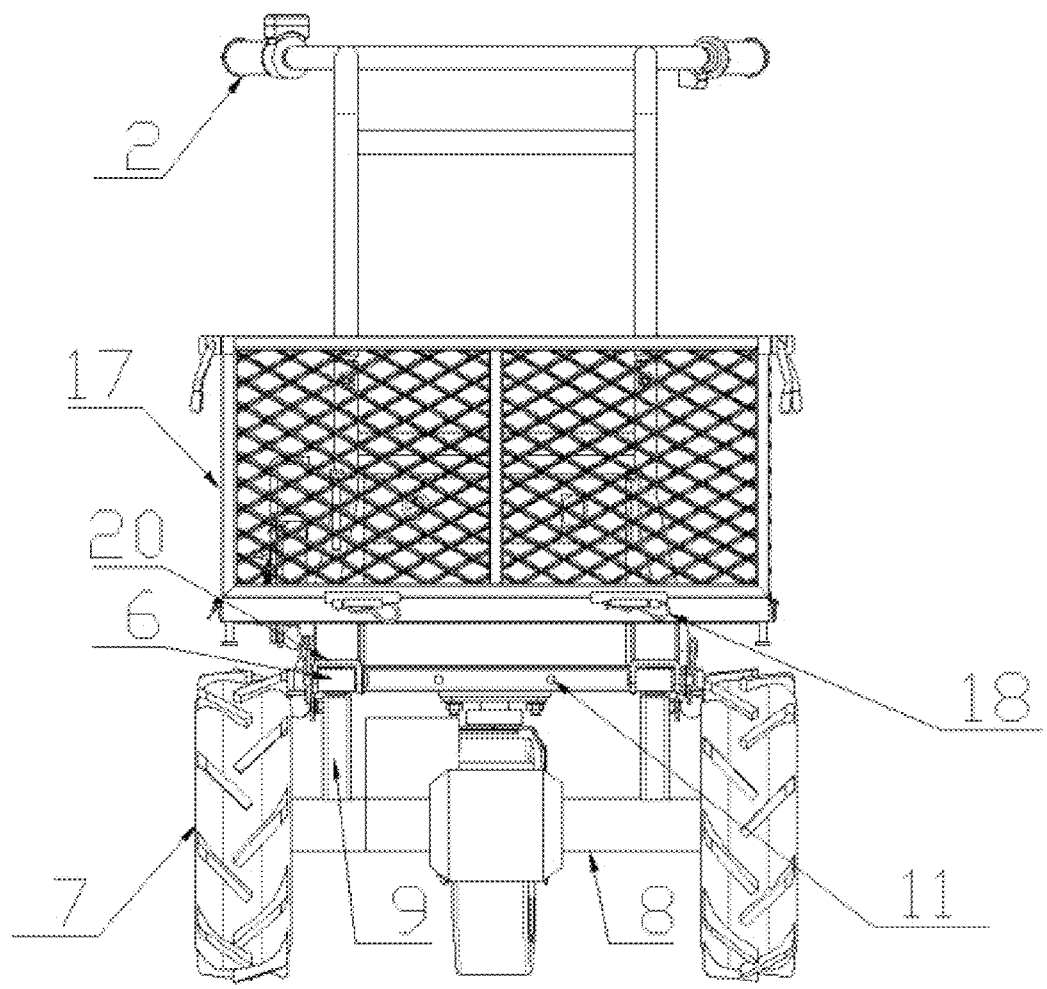
FIG. 5 is a front view showing the cart with the mesh hopper according to the present invention.
Figure 6:
FIG. 6 shows a tractor fitting with a tow ball head according to the present invention.
Figure 7:
FIG. 7 shows a scraper fitting with a shovel according to the present invention.

FIGS. 4-5 is a mesh hopper cart of the present invention fitted with the mesh hopper 17. A front end of the mesh hopper 17 is provided with a second U-shaped groove 20. A middle transom of the mesh hopper is provided with a screw hole. A rear end of the mesh hopper 17 is provided with a grip 16. The second U-shaped groove 20 is clamped on the connecting hole 6 and fixed by the bolt, so that the mesh hopper 17 is fixed at the front end of the frame 1. The middle transom under the mesh hopper 17 and the rear beam screw hole of the frame 1 are fixed by the bolt, so that the mesh hopper 17 is fixed at the central position of the frame 1. When the mesh hopper cart is transporting the objects, the mesh hopper 17 does not sway side to side. A holding groove of the grip 16 is clamped on the snib 4, so that the mesh hopper 17 is fixed at the rear end of the frame 1. The second U-shaped groove 20 is rotatable about the bolt when the mesh hopper 17 is turned. A groove opening width of the second U-shaped groove 20 is greater than the width of the T-shaped column 9. When the mesh hopper 17 is turned, the second U-shaped groove 20 is rotated around the bolt and not stuck by the T-shaped column 9, thereby forming the mesh hopper cart that can transport objects without scattering the objects. Baffles at sides of the mesh hopper 17 are connected and fixed with the bottom split pin 18. The baffles at sides of the mesh hopper 17 are removed to form a flatbed cart for loading and unloading objects easily.

The mesh hopper 17 is placed on the frame 1 when in use. The second U-shaped groove 20 is clamped on the connecting hole 6 and fixed by the bolt. The middle transom under the mesh hopper and the rear beam screw hole 5 of the frame 1 are fixed by the bolt. The grip 16 is pushed down, the holding groove of the grip 16 is clamped on the snib 4, such that the mesh hopper 17 is fixed on the frame 1. The objects need to be transported are put into the mesh hopper 17. The switch is pressed to select the forward or reverse gear, then the motor powered by the battery 3 drives the wheels 7 to rotate for transporting. When the objects are transported to the destination, the switch is pressed to stop the power supply of the battery 3 and the wheels 7 stop rotating. The grip 16 is pushed to separate the holding groove from the snib 4 and then pushed up, the mesh hopper 17 is flipped up, the second U-shaped groove 20 is rotated around the bolt, thereby unloading the objects. The grip 16 is provided under the handle 2, when the objects in the mesh hopper 17 are unloaded, it requires less effort to unload the objects in the mesh hopper 17 by pushing up the grip 16 than the handle 2. When the length or width of the object to be transported exceeding the length or width of the mesh hopper 17, the split pin 18 is taken down and the baffles are removed to form a flatbed cart. The middle transom under the mesh hopper 17 and the rear beam screw hole 5 of the frame 1 are fixed by the bolt, such that the bottom of the mesh hopper 17 does not sway side by side in the process of transporting. The baffles at sides of the mesh hopper 17 can be removed to form a flatbed cart for convenient loading and unloading. The baffles at sides of the mesh hopper 17 can be used or not depending on the transportation needs.

The above are several specific embodiments of the present invention, the present invention not only can be fitted with the hopper and the mesh hopper to transport and move objects, but also can be fitted with the tow ball head and the shovel to form a tractor and a scraper.

As shown in FIGS. 1-6, a rear end of the tow ball head is provided with a screw hole screwed with the front beam screw hole 11. A side of the tow ball head is provided with the screw hole screwed with the first T-shaped column screw hole 21, so that the tow ball head is fixed on the frame 1 to form a tractor.

The rear end of the tow ball head is sleeved on the front beam of the frame 1 when in use. Specifically, the rear end of the tow ball head is fixed on the front beam of the frame 1 by the bolt. The side screw hole of the tow ball head and the first T-shaped column screw hole 21 are fixed by the bolt, so that the tow ball head is fixed on the frame 1. One end of the rope is roped to the tow ball head and the other end is roped to the objects to be transported. The switch is pressed to select reverse gear, then the motor powered by the battery 3 drives the wheels 7 to rotate. The tow ball head provides tension to the rope. The objects are dragged by the rope. After the object arriving at the destination, the switch is pressed to stop the power supply of the battery 3 and the wheels 7 stop rotating.

As shown in FIGS. 1-5 and 7, a rear end of the shovel is provided with a screw hole fixed the second T-shaped column screw hole 10, so that the shovel is fixed on the frame 1 to form a scraper. A width of the rear end of the shovel is less than a spacing between the two connecting holes 6 on the two sides of the front end of the frame 1. A distance between the shovel and the ground can be adjusted.

The screw hole is screwed with the second T-shaped column screw hole 10 when in use, so that the shovel is fixed on the frame 1.

The scraper can be used to clear snow. When an upper surface of the snow is lower or aligned to the upper part of the shovel, the bottom of the shovel is aligned to the bottom of the wheels 7, that is, the bottom of the shovel is in contact with the ground. The screw hole is fixedly connected to the second T-shaped column screw hole 10, such that the shovel is fixed on the frame 1. The switch is pressed to select forward gear, then the motor powered by the battery 3 drives the wheels 7 to rotate for shoveling snow. After the snow is cleared, the switch is pressed to stop the power supply of the battery 3 and the wheels 7 stop rotating.

When the ground snow thickness is higher than the height of the shovel, the upper part of the shovel is slightly higher than the upper surface of the snow, the screw hole is fixedly connected to the second T-shaped column screw hole 10, such that the shovel is fixed on the frame 1. The switch is pressed to select forward gear, then the motor powered by the battery 3 drives the wheels 7 to rotate, the shovel is driven by the frame 1 to move forward for shoveling snow. After the snow is cleared, the switch is pressed to stop the power supply of the battery 3 and the wheels 7 stop rotating. The bolt fixed at the second T-shaped column screw hole 10 is unscrewed, the shovel is rotated to lower the front end of the shovel, then the bolt fixed at the second T-shaped column screw hole 10 is screwed. The switch is pressed to select forward gear, then the motor powered by the battery 3 drives the wheels 7 to rotate, the shovel is driven by the frame 1 to move forward to continue shoveling snow. Until the snow thickness is lower than the height of the shovel or the upper surface of the snow is aligned to the lower part of the shovel, the height of the shovel is not adjusted. The snow is clean removed.

The scraper can be used to remove snow as well as soil, sand, lime, coal, etc.

The frame of the present invention has a plurality of parts for connecting with the attachments. People can change different attachments to achieve different purposes depending on the needs of transportation. one frame can be connected to multiple attachments. Different purposes can be achieved by fitting different attachments to one frame, thereby saving cost and space.

The above are only preferred embodiments of the present invention, which should not limit the scope of the present invention. Any modifications or substitutions easily thought of by any skilled in the art within the scope of the present invention are included within the protection scope of the present invention. The scope of the present invention should be defined by the claims.

What is claimed is:

1. A versatile electric cart, comprising: a frame, a handle, a battery, a motor, a wheel, and an axle;
  wherein the battery is configured to power the motor; the motor is configured to drive the wheel; the frame is provided with a component comprising a snib, a screw hole, a connecting hole and a T-shaped column for connecting and fitting with different attachments; and the attachments are fitted to the frame by the snib, the screw hole, the connecting hole or the T-shaped column to form the versatile electric cart with multiple functions; and the screw hole is selected from a front beam screw hole arranged on a front beam of the frame, a rear beam screw hole arranged on a rear beam of the frame, a first T-shaped column screw hole and a second T-shaped column screw hole; two sides of a front end of the frame are respectively provided with the connecting hole and the T-shaped column; the T-shaped column is provided on the axle; a horizontal portion of the T-shaped column is provided with the first T-shaped column screw hole; a vertical portion of the T-shaped column is provided with the second T-shaped column screw hole; and a front end of the T-shaped column is provided with the connecting hole.

2. The versatile electric cart according to claim 1, wherein the attachments comprise a hopper; a bottom of a front end of the hopper is provided with a first U-shaped groove; a rear end of the hopper is provided with a grip; the first U-shaped groove is fitted in the connecting hole and fixed by a bolt; the first U-shaped groove is rotatable about the bolt when the hopper is turned; and a holding groove of the grip is clamped on the snib, so that the hopper is fixed on the frame to form a hopper cart.

3. The versatile electric cart according to claim 1, wherein a groove opening width of the first U-shaped groove is greater than a width of the T-shaped column.

4. The versatile electric cart according to claim 2, wherein the cart hopper is provided with a longitudinal beam connecting with the first U-shaped groove; a front end face of the longitudinal beam and a front end face of the first U-shaped groove are in the same vertical plane; when the first U-shaped groove rotates around the bolt, the longitudinal beam is not in contact with the connecting hole.

5. The versatile electric cart according to claim 1, wherein the attachments comprise a mesh hopper; a front end of the mesh hopper is provided with a second U-shaped groove; a middle transom of the mesh hopper is provided with a screw hole; a rear end of the mesh hopper is provided with a grip; the second U-shaped groove is clamped on the connecting hole and fixed by a bolt; the second U-shaped groove is rotatable about the bolt when the mesh hopper is turned; a holding groove of the grip is clamped on the snib; the screw hole is screwed with the rear beam screw hole, so that the mesh hopper is fixed on the frame to form a mesh hopper cart.

6. The versatile electric cart according to claim 1, wherein a groove opening width of the second U-shaped groove is greater than the width of the T-shaped column.

7. The versatile electric cart according to claim 1, wherein the attachments comprise a tow ball head; a rear end of the tow ball head is provided with a screw hole screwed with the front beam screw hole; a side of the tow ball head is provided with the screw hole screwed with the first T-shaped column screw hole, so that the tow ball head is fixed on the frame to form a tractor.

8. The versatile electric cart according to claim 1, wherein the attachments comprise a shovel; a rear end of the shovel is provided with a screw hole fixed to the second T-shaped column screw hole, so that the shovel is fixed on the frame to form a scraper.

9. The versatile electric cart according to claim 1, wherein a width of the rear end of the shovel is less than a spacing between the two connecting holes on the two sides of the front end of the frame.

\* \* \* \* \*